United States Patent [19]
Oren et al.

[11] Patent Number: 5,154,809
[45] Date of Patent: * Oct. 13, 1992

[54] PROCESS FOR PURIFYING WATER

[75] Inventors: Yoram Oren, Beer Sheva, Israel; Anthony Giuffrida, Andover, Mass.; Stephen Ciaccio, Nashua, N.H.

[73] Assignee: Millipore Corporation, Bedford, Mass.

[ * ] Notice: The portion of the term of this patent subsequent to Dec. 30, 2003 has been disclaimed.

[21] Appl. No.: 417,950

[22] Filed: Oct. 6, 1989

Related U.S. Application Data

[60] Continuation-in-part of Ser. No. 908,913, Sep. 18, 1986, Pat. No. 4,925,541, which is a division of Ser. No. 762,804, Aug. 2, 1985, Pat. No. 4,632,745, which is a continuation of Ser. No. 628,930, Jul. 9, 1984, abandoned.

[51] Int. Cl.$^5$ .............................................. B01D 61/00
[52] U.S. Cl. .................. 204/182.4; 204/182.5; 204/182.3; 204/301
[58] Field of Search .................. 204/182.4, 301, 182.3, 204/182.5

[56] References Cited

U.S. PATENT DOCUMENTS

| | | | |
|---|---|---|---|
| 4,165,273 | 8/1979 | Azarov et al. | 204/301 |
| 4,632,745 | 12/1986 | Giuffrida et al. | 204/301 |
| 4,925,541 | 5/1990 | Giuffrida et al. | 204/182.5 |
| 4,931,160 | 6/1990 | Giuffrida | 204/301 |

OTHER PUBLICATIONS

Dowex Monospheres Resins Brochures, Mar. 1988.

*Primary Examiner*—John Niebling
*Assistant Examiner*—Arun S. Phasge
*Attorney, Agent, or Firm*—Andrew T. Karnakis; Paul J. Cook

[57] ABSTRACT

A process is provided for removing ions from water which is passed through an ion depletion compartment of an electrodeionization apparatus. The electrodeionization apparatus contains an ion depletion compartment containing mixed ion exchange resin beads and an ion concentration compartment which may contain ion exchange resin beads in a given separation stage having an anode and a cathode. The anion resin beads and cation resin beads utilized each comprise beams of substantially uniform size. A second liquid is passed through the ion concentration compartment to collect ions under the influence of DC potential which pass from the depletion compartments into the concentration compartments through ion permeable membranes. The electrodeionization apparatus can be operated continuously since resin regeneration is not required.

18 Claims, 5 Drawing Sheets

PROCESS FOR PURIFYING WATER

REFERENCE TO RELATED APPLICATIONS

This application is a continuation in part of copending application Ser. No. 908,913, filed Sep. 18, 1986, now U.S. Pat. No. 4,925,541 which is a divisional application of Ser. No. 762,804, filed Aug. 2, 1985, now U.S. Pat. No. 4,632,745 which is a continuation of application Ser. No. 628,930, filed Jul. 9, 1984, now abandoned.

This application also is a continuation in part of copending application Ser. No. 275,314, filed Nov. 23, 1988, now U.S. Pat. No. 4,931,160 which is a continuation of application Ser. No. 048,161, filed May 11, 1987, now abandoned.

BACKGROUND OF THE INVENTION

This invention relates to an electrodeionization process wherein liquid to be purified is passed through an ion depletion compartment containing substantially uniform sized anion resin beads and uniform sized cation resin beads under the influence of a polar field in order to effect ion transfer from the liquid in the ion depletion compartment to liquid in an ion concentration compartment.

The purification of a liquid by reducing the concentration of ions or molecules in the liquid has been an area of substantial technological interest. Many techniques have been used to purify and isolate liquids or to obtain concentrated pools of specific ions or molecules from a liquid mixture.

The most well known processes include distillation, electrodialysis, reverse osmosis, liquid chromatography, membrane filtration and ion exchange. A lesser known method is electrodeionization, occasionally mistermed filled cell electrodialysis.

The first apparatus and method for treating liquids by electrodeionization was described by Kollsman in U.S. Pat. Nos. 2,689,826 and 2,815,320. The first of these patents describes an apparatus and process for the removal of ions within a liquid mixture in a depletion chamber through a series of anionic and cationic diaphragms into a second volume of liquid in a concentration chamber under the influence of an electrical potential which causes the preselected ions to travel in a predetermined direction. The volume of the liquid being treated is depleted of ions while the volume of the second liquid becomes enriched with the transferred ions and carries them in concentrated form. The second of these patents describes the use of macroporous beads formed of ion exchange resins as a filler material positioned between the anionic or cationic diaphragms. This ion exchange resin acts as a path for ion transfer and also serves as an increased conductivity bridge between the membranes for the movement of ions.

The term "electrodeionization" refers to the process wherein an ion exchange material is positioned between anionic and cationic diaphragms. The term "electrodialysis" refers to such a process which does not utilize ion exchange resins between the anionic and cationic diaphragms. Illustrative of other prior art attempts to use a combination of electrodialysis and ion exchange materials or resins to purify saline from brackish are described in U.S. Pat. Nos. 2,794,770; 2,796,395; 2,947,688; 3,384,568; 2,923,674; 3,014,855 and 4,165,273. Attempts to improve electrodeionization apparatus are shown in U.S. Pat. Nos. 3,149,061; 3,291,713; 3,515,664; 3,562,139; 3,993,517 and 4,284,492.

A commercially successful electrodeionization apparatus and process is described in U.S. Pat. No. 4,632,745. The apparatus utilizes ion depletion compartments containing an ion exchange solid composition and a concentration compartment which is free of ion exchange solid material. The electrodeionization apparatus includes two terminal electrode chambers containing an anode and a cathode respectively which are utilized to pass direct current transversely through the body Of the apparatus containing a plurality of ion depletion compartments and ion concentration compartments. In operation, the dissolved ion salts of the liquid are transferred through the appropriate membranes from the ion depletion compartments to the ion concentration compartments. The ions collected in the ion concentration compartments are removed through discharge outlets and are directed to waste.

At the present time, anion exchange beads and cation exchange beads having a substantially uniform bead size are available for use in ion exchange processes that is, in processes wherein an ion dissolved in a liquid can be exchanged with an ion ionically bonded to the beads. Prior to their use, the regenerated beads must be washed with water in order to remove leachable components in the beads such as, residual regenerant, total organic carbon components and polymeric leachables such as sulfonated polystyrene. These leachable components must be removed prior to use in order to prevent contamination of the aqueous medium being treated or contaminating downstream apparatus or processes. It has been found that when utilizing the substantially uniform size ion exchange beads, the rinse or flush out time required can be as low as about $\frac{1}{3}$ the flush out time required to clean commercially available beads having a non-uniform bead size. By the phrase, "flush out time" as used herein means the time required to obtain a quality improvement of effluent water contacting the beads before the water quality reaches a substantially constant level. Prior to the present invention, a substantially uniform sized ion exchange beads have not been utilized in an electrodeionization process.

SUMMARY OF THE INVENTION

This invention is based upon the discovery that substantially uniform sized ion exchange beads can be utilized in an electrodeionization process and can be rinsed to remove extractables, prior to use in a time of from about one fourth to about one thirtyth or less of the time required to flush out non-uniformly sized ion exchange beads normally utilized in an electrodeionization process. By the phrase "substantially uniform size" as applied to the anion resin beads or the cation resin beads as used herein means that 90% of the beads are within ±10% of the mean bead size and that the relative average size of one ionic form of resin beads to a second ionic form of resin beads in a mixture of resin beads is at least 0.8. In the process of this invention, the uniform size resin beads are introduced into the ion depletion compartments of an electrodeionization apparatus and also can be introduced into the ion concentration compartments, if desired, depending upon the mode of electrodeionization. Water is then introduced into the compartments containing the resin beads and is passed therethrough for a period of time needed to effect substantially constant levels of measured extractable in the water removed from the compartments. This flushing is effected while an electrical voltage is applied between an anode and a cathode positioned on either side of the compartments containing the resin beads. Water to be purified then continues to be passed through the ion depletion compartments while water after accepting ions from the ion depletion compartments is discarded. The electrodeionization step can be operated by passing the water being treated in one pass through a given ion depletion compartment or by effecting serpentine flow within two adjacent ion depletion compartments. In addition, the electrodeionization step can be conducted under conditions where voltage polarity is reversed periodically. Additional process steps can be added such as an ultrafiltration step in order to further improve product purity or by a preliminary step wherein water to be purified is exposed to ultraviolet radiation under a wave length that promotes oxidation of organics, e.g., 185 nm so that substantially complete removal of total organic carbon (TOC) can be effected.

DESCRIPTION OF SPECIFIC EMBODIMENTS

Figure 1:
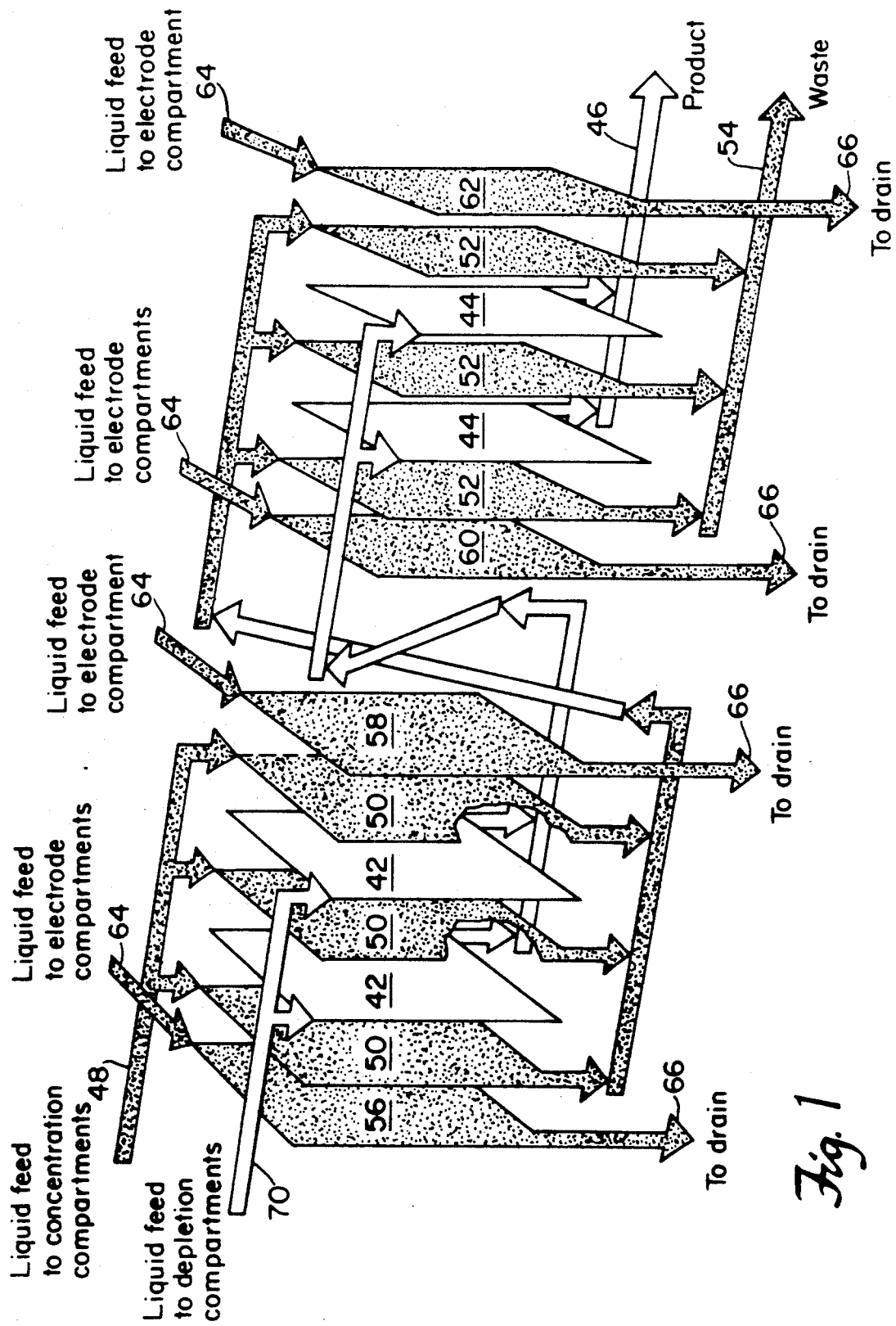
FIG. 1 is a schematic view illustrating the operation of one embodiment of the electrodeionization process of this invention.

Suitable ionic resin beads for use in the present invention are DOWEX MONOSPHERE resin beads 550A and 650C available from Dow Chemical Company, Midland, Mich. The 550A beads and 650C beads have 90% of the beads within ±10% of the mean bead size. The mean bead size of the 550A anionic resin beads is 550 micrometers while the 650C cationic resin beads has a mean bead size of 650 micrometers. The relative average size of the cationic resin beads to the anionic resin beads or vise versa should be at least about 80 percent of the other resin beads, preferably of substantially equal average size. In use, anionic resin beads, cationic resin beads or a mixture of anionic resin beads and cationic resin beads are placed into ion depletion compartments and may be placed into ion concentration compartments prior to passing water through the electrodeionization device. Water is then passed through the compartments containing the resin beads until the extractables removed from the beads into the water reaches a substantailly constant low level. Water to be purified then is passed through the ion depletion compartment of the electrodeionization apparatus in the manner described below. The electrodeionization step is comprised of ion depletion compartments which are positioned in alternating relationship with ion concentration compartments. The ion depletion compartments are defined by alternating anion permeable membranes and cation permeable membranes which are sealed in a manner to prevent leakage between ion depletion compartments and ion concentration compartments. The ion depletion compartments contain a mixture of anion resin beads and cation resin beads to promote ion transfer from water in the ion depletion compartments. The alternating ion depletion compartments and ion concentration compartments are positioned between an anode and a cathode. Water to be purified is passed through the ion depletion compartments while water used to accept ions from the ion depletion compartments is passed through the ion concentration compartments. In operation, an electrical voltage is applied between the anode and cathode which promotes ion transfer from the water in the ion depletion compartments through the anion permeable membrane and the cation permeable membrane and into the water passing through the adjacent ion concentration compartments. In the electrodeionization step, the ions removed from the water are not retained by the membranes or resin beads but are removed with the water passing through the ion concentration compartments. Therefore, the electrodeionization step ca be operated continuously without the need to replace or regenerate the resin particles or membranes.

Prior to conducting the electrodeionization process of this invention with ion exchange resin beads of substantially uniform size, the beads are flushed out with water under a voltage gradient between the cathode and the anode in order to remove extractables from the beads. With standard nonuniform size resins, the procedure requires an average of about two hours to generate a product stream having a satisfactory low extractables concentration. With the uniform sized beads utilized in the present invention, anionic and cationic resin beads of substantially equal average size, e.g. 550 micrometers-550 micrometers, have a flush out time as quickly as one minute or less varying from about 50 seconds to about 20 minutes, depending on voltage and flow conditions, cell design and construction and water quality desired while anionic and cationic resin beads having an average size of about 4/5 give a flush out time of about 8 minutes. This compares to an average flush out time with standard nonuniform size resin beads of about 1 hour to 4 hours or more.

In a specific embodiment of this invention, the electrodeionization step is conducted by the process and with the apparatus disclosed in U.S. Pat. No. 4,632,745, issued Dec. 30, 1986 which is incorporated herein by reference. As disclosed in the patent, an electrodeionization apparatus is provided wherein each electrodeionization electrical stage includes an anode and a cathode, and their compartments, a series of ion concentration compartments and a series of ion depletion compartments that contain a mixture of anion exchange resin and cation exchange resin. The depletion compartments are formed so that the ion exchange resin mixture is housed within independent discrete subcompartments each of which has a width between about 0.3 and 4 inches, preferably between about 0.5 and 1.5 inches. The discrete subcompartments are formed by securing, such as by bonding, both the anion permeable membrane and the cation permeable membrane to the periphery of the depletion compartment and to ribs which extend across the thickness of and along the entire length of the depletion compartment so that each subcompartment is defined by a pair of ribs, the anion permeable membrane and the cation permeable membrane. The thickness of the subcompartments as defined by the distance between the anion permeable membrane and the cation permeable membrane is between about 0.05 and 0.25 inches, preferably between about 0.06 and 0.125 inches. In this embodiment, it has been found that the thickness and width of the depletion compartments are critical to achieving efficient operation of the electrodeionization apparatus. The solid ion exchange material positioned within the subcompartments are constrained from moving between subcompartments by the ribs and ion permeable membranes.

The electrodeionization apparatus can comprise one or a plurality of stages. In each stage, an anode is positioned at an opposite end of a stack of depletion and concentration compartments from an end at which a cathode is positioned. Each anode and cathode is provided with an adjacent electrode spacer and an ion permeable membrane wherein an electrolyte passes through the electrode spacer. The remaining portion of each stage comprises a series of alternating depletion and concentration compartments constructed as set forth herein. The liquid to be depleted of ions can be passed in parallel through each depletion compartment in each stage and a second liquid can be passed through each concentration compartment in parallel in each stage in order to effect removal of ions from the first liquid in the depletion compartments into the second liquid in the concentration compartments. When a plurality of stages are utilized, the liquid removed from the depletion compartments in an upstream stage can be directed in series into the depletion compartments in the next adjacent downstream stage. Similarly, the liquid removed from the concentration compartments of an upstream stage can be directed in series to the concentration compartments in the next adjacent downstream stage. Electrolyte can be passed through the spacer adjacent each electrode in the electrodeionization apparatus and is removed from the electrodeionization apparatus.

The subcompartments in the depletion compartments have a controlled thickness and width in order to sustain high efficiency for ion depletion over long periods. There is no limit on the length of the compartment other than as dictated by practical construction and fluid pressure loss considerations. Obviously, the longer the subcompartment length, the greater the ion removal from the liquid therein. Generally, the length of the subcompartments are between about 5 inches and about 70 inches. When it is desired to remove only a particular anion or particular cation, 100% of the appropriate exchange material is used. Usually it is desired to remove both cations and anions in order to produce a purified liquid product. The ratio of anion exchange resin beads to cation exchange resin beads generally are about 60 to 40 by volume. By utilizing the subcompartment structure in the depletion compartments, efficient mixing of the liquid and the beads therein is attained while avoiding channeling of the liquid through the depleting compartment. Thus, efficient interchange of the ions and the liquid in the depletion compartment with the ions in the beads to effect ion removal from the liquid in the depletion compartment is attained. Furthermore, it has been found that by controlling the geometry of the subcompartments as set forth herein, relatively low energy requirements for the electrodeionization apparatus can be utilized even over long periods to attain desired liquid purity.

Referring to FIG. 1, the flowpaths of the liquids in the various compartment are explained. Liquid to be purified enters inlet 40, passes through depletion compartments 42, is then passed through depletion compartments 44 and is recovered from outlet 46. Concentrating liquid is passed through inlet 48 through concentration compartments 50 and 52 and hence through outlet 54 to drain. Liquid electrolyte is circulated through electrode compartments 56, 58, 60 and 62 from inlets 64 and is discarded to drain through outlets 66.

Any anion permeable membrane or cation permeable membrane having the strength to withstand the operating pressure differential, typically up to about 5 psi, can be utilized in the present invention. It should be pointed out that sealing of the membranes to the ribs forming the subcompartments permits the us of higher operating pressures and enhances the apparatus of the prior art since the assembly strength is thereby increased. Representative suitable anion permeable membranes include a homogeneous type web supported styrene-divinylbenzene based with sulfonic acid or quarternary ammonium functional groups sold under the identifications CR61-CZL-386 and AR 103-QZL-386 by Ionics, Inc.; a heterogeneous type web supported using styrene-divinylbenzene based resins in a polyvinylidene fluoride binder sold under the identifications MC-3470 and MA-3475 by Sybron/Ionac; homogeneous type unsupported-sulfonated styrene and quaternized vinylbenzylamine grafts of polyethylene sheet sold under the name, Raipore by RAI Research Corporation; a homogeneous type web supported styrene-divinylbenzene based with sulfonic acid or quaternary ammonium functional groups sold under the name Aciplex by Asahi Chemical Industry, Ltd.

The electrodeionization step can be controlled by measuring product water conductivity from all or any one of the stages and adjusting the process parameters including process voltage, liquid flow velocities, temperatures, pressures, and electrical current accordingly.

The following is a description of two methods for controlling the demineralization of an electrodeionization system. The methods can be used separately or in combination in a single or multi-electrical staged system. The first method senses the resistivity and temperature of the feed water and the appropriate cell pair voltage is applied to demineralize the liquid to the desired fraction salt removal.

The second method senses the product resistivity and temperature that is used to control the voltage of the stage to produce water of the desired quality. This type of voltage control can be used to provide product water of a pre-selected quality.

An example of a two-stage system is as follows: The first stage is operated at a variable voltage based on the feed water quality (about 0.5 to 5.0 volts per cell pair) appropriate to achieve approximately 70–90 percent salt removal by using a predetermined resistivity/temperature/percent salt removal relationship. The automatically applied voltage permits operation below the polarization point, thus assuring efficient operation without scaling. The second stage is operated at a variable voltage based on the product water quality (about 0.5 to 5.0 volts per cell pair), appropriate to provide water of a pre-selected quality. Since the feed water to the second stage is product water from the first, the second stage feed is less prone to scaling. For this reason polarization in the second stage is acceptable, and the voltage can therefore be varied to any degree to provide the required product quality.

In another aspect of this invention, the electrodeionization step can be operated under conditions of serpentine flow between an anode and a cathode. In accordance with one aspect of this invention, the depletion compartments are arranged and are provided with inlet and outlet means so that water to be purified is passed through at least two depletion compartments between a given set of an anode and a cathode in each stage. Improved ion removal efficiency is attained with the multiple pass process of this embodiment of the invention as compared to a process wherein water to be purified is passed through one depletion compartment in each stage having a length equal to the combined lengths of the multi depletion compartments in each stage. The depletion compartments also are formed so that the ion exchange resin mixture is housed within independent discrete subcompartments each of which has a width of about 0.3 to 4 inches, preferably between about 0.5 and about 1.5 inches. The discrete subcompartments also are formed by securing, such as by bonding both the anion permeable membrane and the cation permeable membrane to the periphery of the depletion compartment and to ribs which extend across the thickness of and along the entire length of the depletion compartment so that each subcompartment is defined by a pair of ribs, the anion permeable exchange membrane and the cation permeable membrane.

In this embodiment electrodeionization apparatus can comprise one or a plurality of stages. In each stage, an anode is positioned at an opposite end of a stack of depleting and concentrating compartments from an end at which a cathode is positioned. Each anode and cathode is provided with an adjacent electrode spacer and an ion permeable membrane wherein an electrolyte passes through the electrode spacer. The remaining portion of each stage comprises a series of alternating depletion and concentrating compartments constructed as set forth herein. The liquid to be depleted of ions can be passed in parallel through each depletion compartment in each stage in order to effect removal of ions from the first liquid in the depletion compartments into the second liquid in the concentration compartments. In any event, the liquid to be purified in this embodiment is passed through at least two depletion compartments in each stage. The direction of flow within the depletion compartments is not critical and can be in the same direction or in an opposite direction to the flow in an adjacent compartment or concentration compartment. When a plurality of stages are utilized, the liquid removed from the depleting compartments in an upstream stage can be directed in series into the depleting compartments in the next adjacent downstream stage. Alternatively, feed water can be directed in a counter flow arrangement in depleting compartments comprising a second stage. Electrolyte can be passed through the spacer adjacent each electrode in the electrodeionization apparatus and is removed from the electrodeionization apparatus. It is preferred that the subcompartment in the depleting compartments have a controlled thickness and width as stated above in order to sustain high efficiency for ion depletion over long periods.

Figure 2:
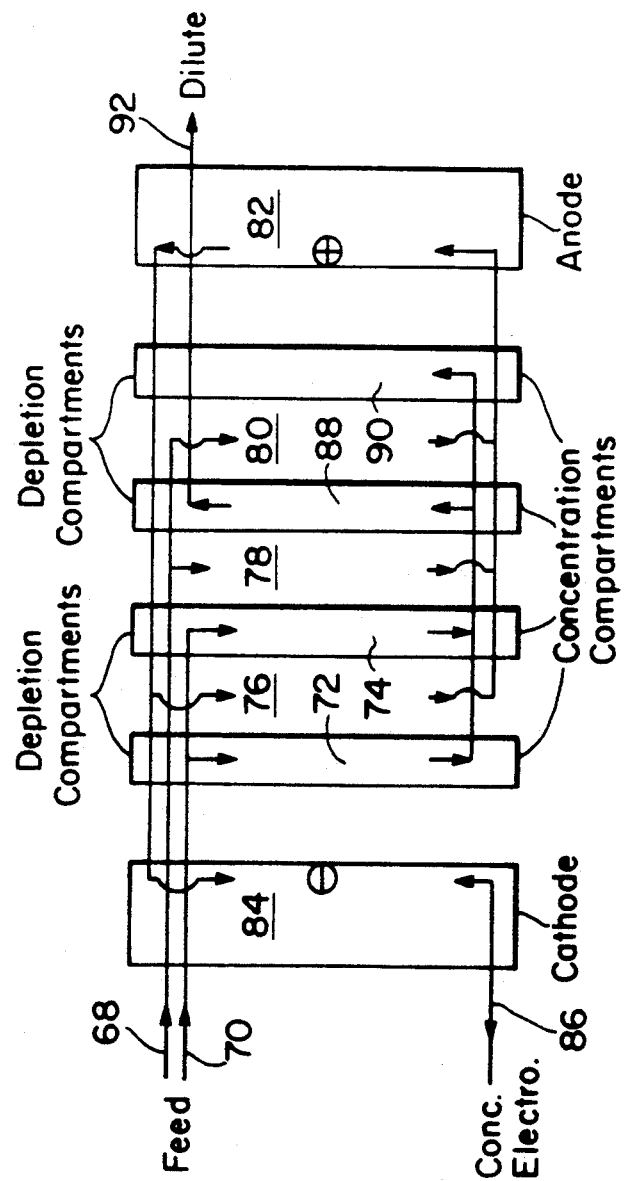
FIG. 2 is a schematic view of a second embodiment of this invention.

As shown in FIG. 2, water to be purified 70 enters depletion compartments 72 and 74 which contains substantially uniform size resin beads. Concentration water feed stream 68 enters concentration compartments 76, 78 and 80. The concentration water passes from concentration compartments 76, 78, and 80 into anode compartment 82 and thence to cathode compartment 84 and to drain 86. The water to be purified passes from depletion compartments 72 and 74 through depletion compartments 88 and 90 and then is recovered from stream 92.

In another aspect of this invention, the electrodeionization steps described above can be operated under conditions of voltage polarity reversal during water purification. During operation, the polarity of voltage applied to the electrodes in the electrodeionization apparatus is reversed in order to dissolve and desorb organics at the cathode, to oxidize deposits and dissolve any scale at the anode, to dissolve any scale from prior cycles in the newly formed depletion compartments and to desorb any adsorbed foulants that may be deposited during use of the apparatus in the newly formed concentration compartments. As a result of voltage polarity reversal, the compartments which were initially ion depleting compartments become ion concentrating compartments. There is no need to direct product liquid to waste as a consequence of voltage polarity reversal since there is an unexpected rapid ion migration and ion depletion within the newly formed ion depletion compartments combined with a time delay in the increase of concentration in the newly formed concentration compartments such that the product liquid never attains an unacceptably high concentration of ions. Also, the time between reversal cycles can be extended due to an unexpected time delay of any pH shifts in the concentrating and cathode streams thereby decreasing the scaling potential in the device.

As set forth herein, the term "dual compartment" means a compartment formed of an odd number of permeable membranes, at least one depletion compartment and at least one concentration compartment, each of which compartments are divided into subcompartments, as described above. The ion permeable membranes are arranged so that the anion permeable membrane and the cation permeable membrane alternate along the thickness of the dual compartment. Thus, the dual compartment can include one more cation permeable membrane than anion permeable membrane or can include one more anion permeable membrane than cation permeable membrane of the odd number ion permeable membranes. It has been found in accordance with this invention that the dual compartment structure permits reversing voltage polarity in a manner which does not require directing a portion of the liquid product to waste due to the presence of the solid ion exchange material positioned within the subcompartments by the ribs and by the ion permeable membranes.

The electrodeionization apparatus can comprise one of a plurality of stages. In each stage, the anode is positioned at an opposite end of a stack of depleting and concentrating compartments from an end at which the cathode is positioned. Each anode and cathode is provided with an adjacent electrode spacer and an ion permeable membrane wherein an electrolyte passes through the electrode spacer. The remaining portion of each stage comprises a series of alternating depletion and concentration compartments constructed as set forth herein. The liquid to be depleted of ions can be passed in parallel through each depletion compartment in each stage and a second liquid can be passed through each concentration compartment in parallel in each stage in order to effect removal of ions from the first liquid in the depletion compartment into the second liquid into the concentration compartment. When a plurality of stages are utilized, the liquid removed from the depletion compartments in an upstream stage can be directed in series into the depletion compartments of the next adjacent downstream stage. Similarly, the liquid removed from the concentration compartments of an upstream stage can be directed in series to the concentration compartments in the next adjacent downstream stage. Electrolyte can be obtained from the feed, product, neutral, or concentrate streams or from an independent source and passed through the spacer adjacent to each electrode in the electrodeionization apparatus and is removed from the electrodeionization apparatus. Optionally, electrolyte from the spacer adjacent the electrode can be passed through one or more neutral zones prior to being directed to waste. Scale and organics build up within the electrodeionization apparatus, particularly at the electrodes, is prevented by periodically reversing the voltage polarity such that the original anode becomes a cathode and the original cathode becomes the anode. When voltage polarity is reversed, the original depletion compartments become concentration compartments and concentration compartments become depletion compartments. At the electrodes any accumulated scale is cleaned during the anodic cycle and any accumulated organics are dissolved during the cathodic cycle and are removed. Also any accumulated scale in the concentrating compartments is dissolved during the initial period of the diluting cycle and is rinsed to drain. In addition, any organic foulants accumulated during the diluting cycle are desorbed from the resin and membranes during the concentrating cycle by the action of increased salinity and pH and removed in the waste stream so that their presence does not adversely affect the quality of the water or function of the equipment.

During voltage polarity reversal, it would be expected that a portion of the liquid recovered from the compartments would need be discarded since ion removal would not be sufficiently rapid during the polarity reversal. However, surprisingly, the ion removal from the newly formed depletion compartments is sufficiently rapid and during the initial period after reversal there is a delay time between polarity reversal and deterioration of water quality in the newly formed concentration stream so that the liquid product need not be discarded at any time during or between any cycle. In other words, the conductivity of the liquid product from either or both of the newly formed depletion or concentration compartments are sufficiently low as to render the liquid product acceptable in one stream or the other stream or both. This result is very desirable since it eliminates the need for valving and conduit means for directing a portion of the liquid product from the newly formed depletion compartment to waste followed by a reversal of the system flow to effect recovery of the liquid product from the newly formed depletion compartments. Also since polarity reversal in accordance with this invention permits continuous recovery of high quality product, the prior art need for a holding tank system with associated pumping capacity is desirably eliminated.

In addition, it would be expected that the time between polarity reversal would be short, to prevent the immediate localized formation of scale on surfaces such as the cathode and anion membranes. However, localized scaling is minimized by the pH buffering action of the ion-exchangers in the concentrating and/or electrode streams. Therefore the time between polarity reversal can be extended resulting in purer product on the average. It is essential that the subcompartments in the depletion and concentration compartments have a controlled thickness and width in order to sustain high efficiency of ion depletion over long periods as set forth above.

Furthermore, as shown in the example below, the flush out time needed to initiate the water purification process of this invention is unexpectedly short when utilizing ion exchange resin beads of substantially uniform size.

Figure 3:
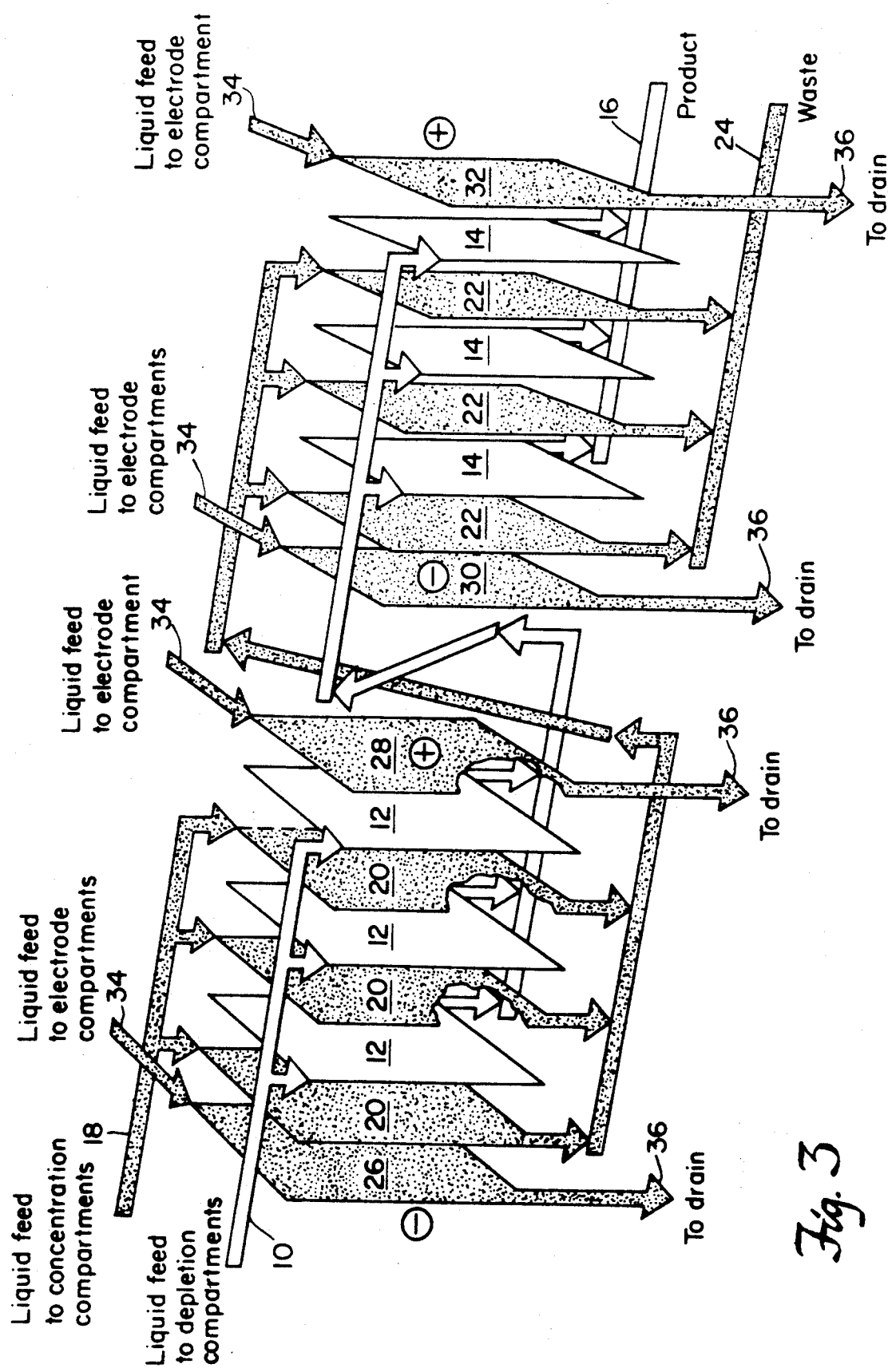
FIGS. 3 and 4 are schematic views illustrating an embodiment of this invention wherein polarity is reversed during operation of the electrodeionization step.

Referring to FIG. 3, liquid to be purified enters inlet 10 and passes through depletion compartments 12, through depletion compartments 14 and then is recovered from outlet 16. Concentrating liquid is passed through inlet 18, through concentration compartments 20 and 22 thence through outlet 24 to drain. Liquid electrolyte is circulated through electrode compartments 26, 28, 30 and 32 from inlets 34 and is discarded to drain through outlets 36. When operated in the mode shown in FIG. 1, electrode compartments 26 and 30 comprise cathodes and electrode compartments 28 and 32 comprise anodes.

Figure 4:
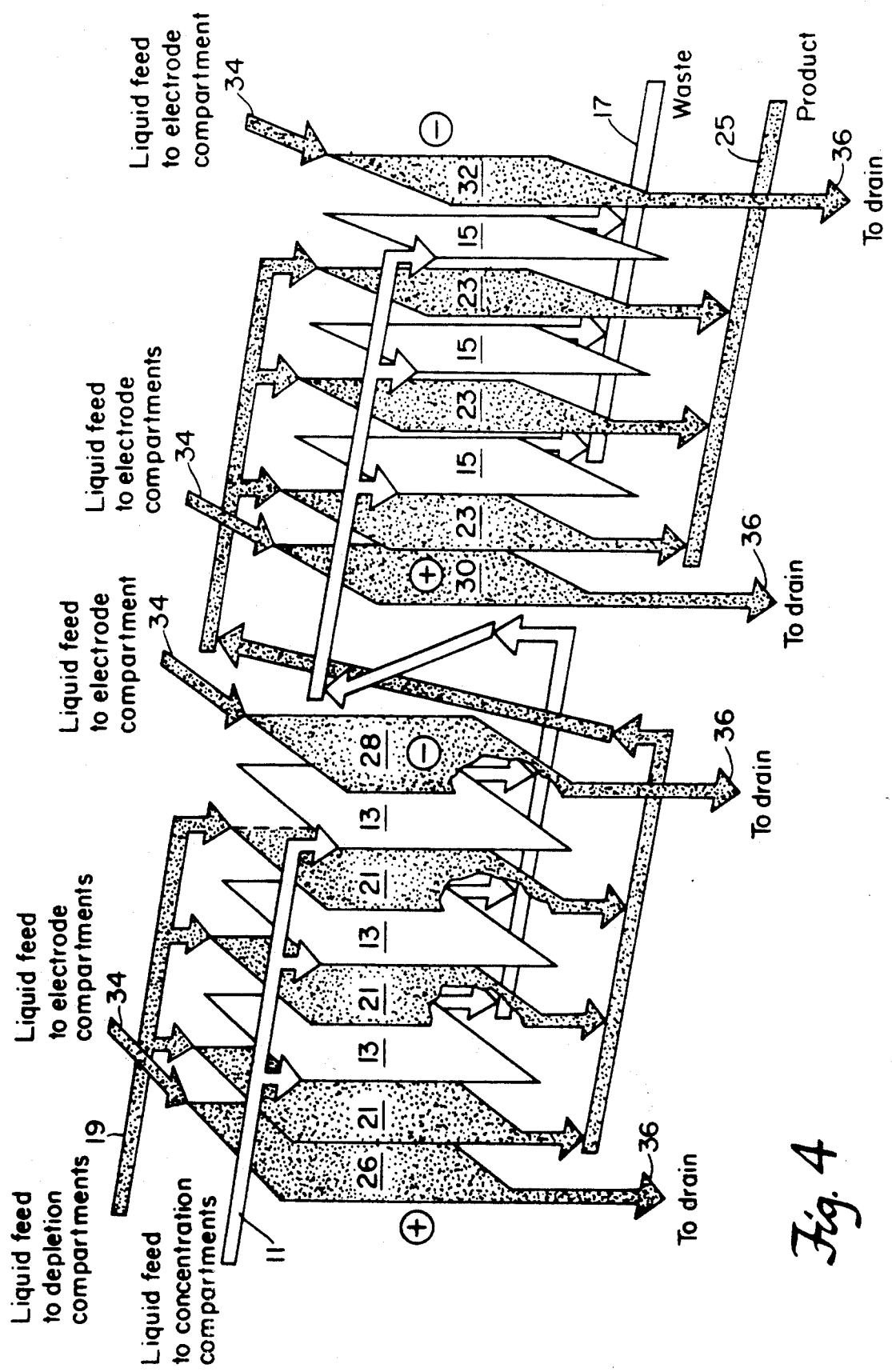

Referring to FIG. 4, the polarity of the electrodes is reversed such that electrodes 26 and 30 comprise anodes and electrodes 28 and 32 comprise cathodes where a liquid electrolyte is circulated therethrough from inlets 34 and is discarded to drain through outlets 36. Because of the polarity reversal, the depletion compartments 12 of FIG. 3 now become concentration compartments 13 and the depletion compartments 14 of FIG. 3 become concentration compartments 15. Similarly, the concentration compartments 20 and 22 of FIG. 3 become concentration compartments 15. Similarily, the concentration compartments 20 and 22 of FIG. 3 become depletion compartments 21 and 23. Therefore, the product outlets 16 of FIG. 3 becomes a waste stream 17 while the waste stream 24 of FIG. 4 becomes a product stream 25.

Figure 5:
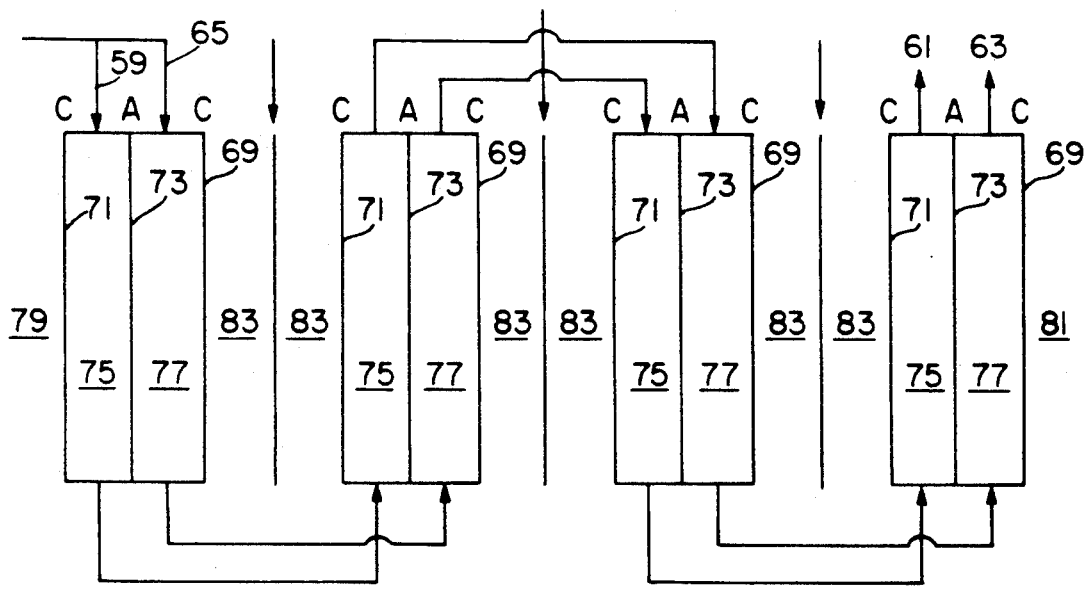
FIG. 5 is a schematic view showing one flow path arrangement useful when reversing polarity.
Figure 6:
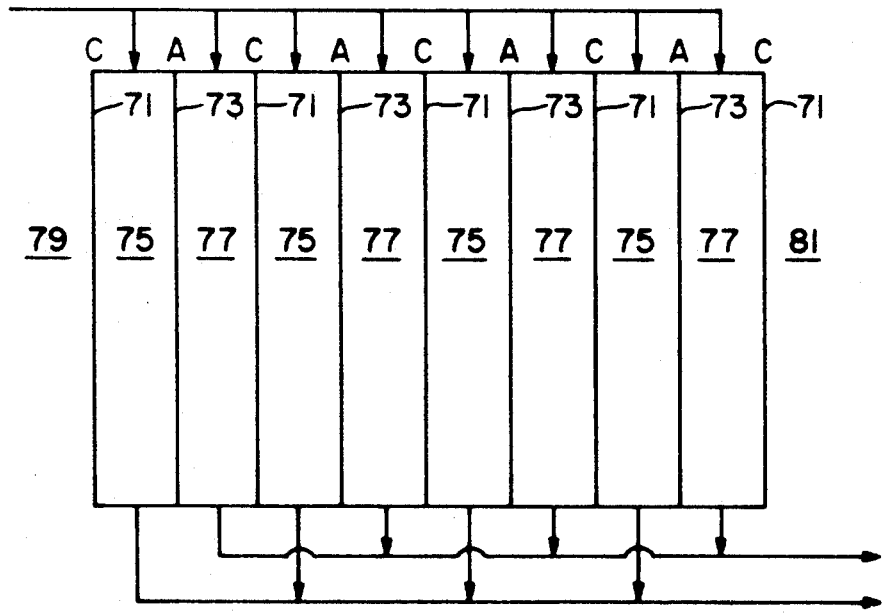
FIG. 6 is a schematic view showing an alternative flow path arrangement useful for reversing polarity.

Referring to FIG. 5, an arrangement of dual compartments is shown each of which includes two cation permeable membranes 69 and 71 and anion permeable membrane 73 separated by and bonded to spacers 75 and 77 as set forth above. When the polarity of electrode 79 is negative the compartments including spacer 75 is an ion depleting compartment while the compartment including spacer 77 is an ion concentration compartment. When the polarity of electrode 79 is positive and the polarity of electrode 81 is negative, the compartments including spacer 75 become ion concentration compartments and the compartments including spacer 77 comprise ion depletion compartments. The liquid for the depletion and concentration compartments passing through 75 and 77 can be passed in series as shown in FIG. 5 or in parallel as shown in FIG. 6 therethrough or combination of series and parallel flow. An optional construction is shown in FIG. 5 wherein the dual compartment structures are separated by neutral zones 83 which include screens 85. The neutral zones 83 merely function to prevent contact between membranes of adjacent dual compartments. The liquid for the neutral zones 83 can be passed in series or in parallel therethrough and can be fed by the feed stream, electrode streams, depletion or concentration streams as desired and can be directed to waste or fed to the anode or cathode compartments as desired prior to exiting the apparatus.

The following examples illustrate the present invention and are not intended to limit the same.

EXAMPLE 1

A series of electrodeionization units comprised of 4 depletion cells and 4 alternating concentration cells, each 30 cm long and having three subcompartments 0.23 cm thick and 3.3 cm width are positioned between a cathode and an anode. The depletion subcompartments were filled either with conventional Dow MR-3 beads or a mixture of Dowex Monosphere cation and anion beads, both 550 micrometers in diameter.

Both units were tested under the following conditions: challenge solution: Nacl; feed conductivity: 100 us/cm; Product flow rate: 190-200 ml/min; Voltage: 12-13.5 V.

|  | Product Quality | Conventional | Monosphere | Ratio |
|---|---|---|---|---|
| Time to reach (min) | 2 Megohm-cm | 36 | 1.6 | 22 |
|  | 4 Megohm-cm | 96 | 2.8 | 34 |

The table demonstrates that the flushout time with the monospheres was 22 times faster to reach 2 Megohm and 34 times faster to reach 4 Megohm compared with conventional resin.

EXAMPLE II

Two electrodeionization modules having the following geometry: Two series stages with 10 depleting cells per stage and 10 concentrating screen type spacers per stage; both stages positioned between one anode and one cathode; each depleting cell having a flow path length of 13 inches and having three subcompartments 0.090 inches thick and 1.3 inches wide. The depletion compartments were filled with Dowex monosphere resin beads (both 550 micrometers in diameter) at a volume ratio of 70/30 anion to cation. The feed water to the modules was tap water adjusted to 120 microsiemens/cm with the addition of sodium chloride. Both modules produced water in the megohm quality range within 1 to 3 minutes after start up. The fast flushout was unexpected since these stacks with 20 cell pairs contain a large quantity of resin. The response was 20-50 times faster than that observed with similar units containing standard resin mixtures such as Dowex MR-3 beads.

EXAMPLE III

Two electrodeionization modules, 5 GPM and 10 GPM capacity having the following geometry: Each having a single stage with 30 and 60 depleting cells with respectively 31 and 61 concentrating screen type spacers, each depleting cell having a 26 inch flowpath length, and having ten subcompartments 0.090 inch thick and 1.1 inches wide. The depletion compartments were filled with Dowex monosphere beads (550A and XUS40369, both 550 micrometers in diameter) at a volume ratio of 70/30 anion to cation. The feed water to both modules had a conductivity of 80 microsiemens/cm.

EXAMPLE IV

An electrodeionization module having the following geometry: Four stages in series positioned between one anode and one cathode, each stage consisting of one depleting cell, each depleting cell having a flowpath length of 13 inches with three subcompartments of 0.090 inches thick and 1.3 inches wide. The depleting cells in the module were filled with standard Dowex monosphere resins having bead diameter size of 550 micrometers for the anion and 650 micrometers for the cation. The resin ratio in the depleting cells was 70/30 by volume anion to cation. The module contained three concentrating screen-type cells. The feed water to the module was 550 microsiemens/cm of equal parts of sodium chloride and sodium bicarbonate. The required time to megohm quality was eight minutes which although longer than other modules containing both anion and cation beads of 550 micrometers in diameter, was still substantially shorter than the approximately one hour required for similar modules using standard Dowex MR-3.

EXAMPLE V

The performance of two electrodeionization units were compared, each comprised of 8 cells, each cell 30 cm long, and with each cell containing 3 subcompartments each 3.3 cm wide and 0.23 cm thick. Each unit contained two electrodes. All compartments were filled with a mixture of cation and anion exchange resins: one unit with conventional Dow MR-3 and the other unit with Dowex Monospheres, 550 micrometers in diameter. In each unit, four alternate compartments were used as depletion compartments and the other four as concentration compartments. Every 40 minutes the polarity of the electrodes to the two units was reversed. Accordingly, the depletion and the concentration compartments reversed function.

Both units had 4 series stages, and were tested under the following conditions:

Feed solution: NaCl; feed conductivity: 60 microsiemens/cm; product flow: 200 ml/min; voltage applied: 16 volts. The response time for each unit, i.e., the improvement in product resistivity as a function of time, over the 40 minute period between polarity reversals was monitored.

The initial slope for the unit built with the conventional resin was 0.024 normalized resistivity units/min, compared with 0.103 normalized resistivity units/min for the unit built with the Dow monosphere resin. The ratio between the slopes of the two units was 4.3:1 in favor of the unit built with the Dow monosphere resin.

We claim:

1. The process for purifying water to remove organics and ionic species therein which comprises:
   passing said water through ion depletion compartments of an electrodeionization apparatus,
   said electrodeionization apparatus comprising;
   a cathode compartment at a first end of said apparatus,
   an anode compartment at an end of said apparatus opposite said first end,
   a plurality of said ion depletion compartments alternating with ion concentration compartments positioned between said cathode compartment and said anode compartment,
   an anion permeable membrane and a cation permeable membrane,
   said anion permeable membrane and said cation permeable membrane being bonded to a spacer to effect sealing against water leakage between said ion depletion compartment and
   each of said ion depletion compartments containing a mixture of anion resin beads of substantially uniform size and cation resin beads of substantially uniform size,
   passing a second liquid for accepting ions from said water, through said concentration compartments while said water is passed through said ion depletion compartments, applying an electrical voltage between an anode in said anode compartment and a cathode in said cathode compartment, and recovering purified water from said depletion compartment.

2. The process of claim 1 wherein the ion exchange comprises a mixture of anion exchange resin beads and cation exchange resin beads and wherein the volume ratio of anion exchange resin beads to cation exchange resin beads in said ion depletion compartments is between 4.0 and 0.5.

3. The process of claim 1 wherein said water is passed through at least two ion depletion compartments in series positioned between said anode and said cathode.

4. The process for purifying water to remove organics and ionic species therein which comprises:
passing said water through ion depletion compartments of an electrodeionization apparatus comprising,
said electrodeionization apparatus comprising;
a cathode compartment at a first end of said apparatus,
an anode compartment at an end of said apparatus opposite said first end,
a plurality of said ion depletion compartments alternating with ion concentration compartments positioned between said cathode compartment and said anode compartment,
each of said ion depletion compartments comprising a spacer and a plurality of subcompartments formed by a plurality of ribs extending along the length of each of said ion depletion compartments each of said subcompartments containing an ion exchange solid composition, each of said subcompartments having a width defined by the distance between said ribs of between about 0.3 and 4 inches and a thickness between about 0.05 and 0.25 inches.
an anion permeable membrane and a cation permeable membrane,
said anion permeable membrane and said cation permeable membrane being bonded to a spacer to effect sealing against water leakage between said ion depletion compartment and
each of said ion depletion compartments containing a mixture of anion resin beads of substantially uniform size and cation resin beads of substantially uniform size,
passing a second liquid for accepting ions from said water, through said concentration compartments while said water is passed through said ion depletion compartments,
applying an electrical voltage between an anode in said anode compartment and a cathode in said cathode compartment, and
recovering purified water from said depletion compartment.

5. The process of claim 4 wherein the width of said subcompartment is between about 0.5 and 1.5 inches.

6. The process of claim 4 wherein the thickness of said subcompartment is between about 0.06 and 0.125 inches.

7. The process of claims 4, 5 or 6 wherein the ion exchangers comprise a mixture of anion exchange resin beads and cation exchange resin beads and wherein the volume ratio of anion exchange resin beads to cation exchange resin beads in said ion depletion compartments is between 4.0 and 0.5.

8. The process of claim 4 wherein said water is passed through at least two ion depletion compartments in series positioned between said anode and said cathode.

9. The process of claim 4 wherein said ion concentration compartments contain a mixture of anion exchange beads of substantially uniform size and cation exchange beads of substantially uniform size and wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

10. The process of claim 8 wherein electrical voltage supplied to said anode and said cathode is reversed periodically to convert said anode to a second cathode and to convert said cathode to a second anode and to convert said ion depletion compartment to a second ion concentration compartment and to convert said ion concentration compartment to a second ion depletion compartment and recovering a water having low conductivity continuously from said ion depletion compartment and said second ion depletion compartment.

11. A dual compartment construction adapted to remove ions from a liquid which comprises:
an ion depletion compartment and an ion concentration compartment and an odd number of at least three ion permeable membranes,
said ion permeable membranes comprising anion permeable membranes alternately positioned with respect to cation permeable membranes,
each of said ion depletion compartments and each of said ion concentration compartments comprising a spacer and a plurality of ion depletion subcompartments and ion concentration subcompartments,
said subcompartments being formed by a plurality of ribs extending along the length of each of said ion depletion compartments and said ion concentration compartments,
each of said ion depletion subcompartments and said ion concentration subcompartments containing a mixture of anion exchange resin beads of substantially uniform size and cation exchange resin beads of substantially uniform size,
each of said ion depletion subcompartments and said ion concentration subcompartments having a rib defined by the distance between said ribs or between about 0.3 and 4 inches and a thickness between about 0.05 and 0.25 inches wherein the thickness of said subcompartments is defined by the distance between an anion permeable membrane and a cation permeable membrane,
each of said ion permeable membranes being bonded to a spacer and said ribs within a spacer such that the anion permeable membrane and cation permeable membrane are positioned alternatively along the length of said dual compartment,
means for passing a first liquid to be purified through each ion depletion compartment,
and means for passing a second liquid for accepting ions from said first liquid through each ion concentration compartment.

12. The construction of claim 11 wherein the width of said subcompartments is between about 0.5 and 1.5 inches.

13. The construction of claim 11 wherein the thickness of said subcompartments is between about 0.06 and 0.125 inches.

14. The construction of any one of claims 11, 12, or 13 wherein the ion exchange composition comprises a mixture of anionic exchange resin beads and cationic exchange resin beads and wherein the volume ratio of anionic resin beads to cationic exchange resin beads and said ion depletion compartments and in said ion concentration compartments is between about 4.0 and 0.5.

15. The process of any one of claims 1,2,3,4,5,6,8,9 or 10 wherein the anion resin beads and the cation resin beads are of substantially equal average size.

16. The construction of any one of claims 11,12 or 13 wherein the anion resin beads and the cation resin beads are of substantially equal size.

17. The process of claim 7 wherein the anion resin beads and the cation resin beads are of substantially equal average size.

18. The construction of claim 14 wherein the anion resin beads and the cation resin beads are of substantially equal size.

* * * * *